US008505356B2

(12) United States Patent
Cummings

(10) Patent No.: US 8,505,356 B2
(45) Date of Patent: Aug. 13, 2013

(54) APPARATUS AND CALIBRATION METHOD FOR CUP ANEMOMETERS HAVING NON-REMOVABLE CUPSETS

(75) Inventor: David S. Cummings, Rockaway, NJ (US)

(73) Assignee: Enviroplan Consulting, Wayne, NJ (US)

( * ) Notice: Subject to any disclaimer, the term of this patent is extended or adjusted under 35 U.S.C. 154(b) by 266 days.

(21) Appl. No.: 13/113,749

(22) Filed: May 23, 2011

(65) Prior Publication Data

US 2011/0283766 A1 Nov. 24, 2011

Related U.S. Application Data

(60) Provisional application No. 61/347,758, filed on May 24, 2010.

(51) Int. Cl.
*G01F 25/00* (2006.01)
(52) U.S. Cl.
USPC .......................................................... 73/1.29
(58) Field of Classification Search
None
See application file for complete search history.

(56) References Cited

U.S. PATENT DOCUMENTS

| 4,365,504 | A | * | 12/1982 | Haines et al. | 73/1.29 |
| 4,401,147 | A | * | 8/1983 | Beck et al. | 162/263 |
| 2004/0151617 | A1 | * | 8/2004 | Zanakis et al. | 422/4 |
| 2008/0294356 | A1 | * | 11/2008 | Poulos et al. | 702/45 |
| 2008/0307853 | A1 | * | 12/2008 | Siebers et al. | 73/1.29 |

* cited by examiner

*Primary Examiner* — Robert R Raevis
(74) *Attorney, Agent, or Firm* — Barnes & Thornburg LLP

(57) ABSTRACT

An apparatus and method is disclosed for calibrating a cup anemometer having a non-removable cupset. The calibration method may include mechanically connecting a cups assembly hub of the anemometer to a rotatable shaft of a variable-speed motor, placing at least the anemometer under vacuum so that drag effects on the cups assembly hub of the anemometer are eliminated when driven by the variable-speed motor, controlling the variable-speed motor to drive the cups assembly hub of the anemometer at a number of different rotational speeds, recording electrical signals produced by the anemometer at each of the number of different rotational speeds, and generating calibration data for the anemometer based on the recorded electrical signals and on expected wind speed values at each of the number of different rotational speeds.

20 Claims, 3 Drawing Sheets

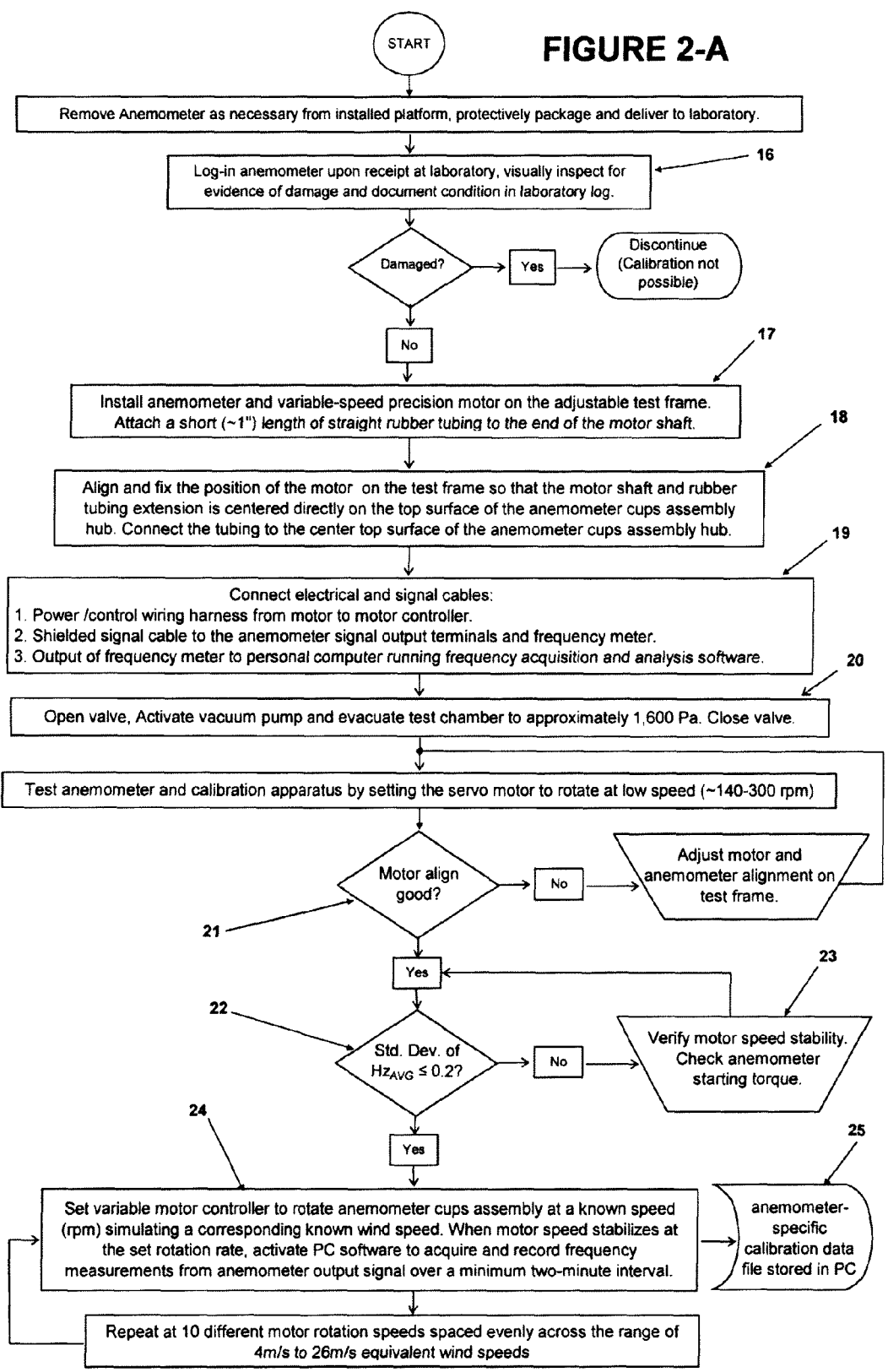
FIGURE 2-A

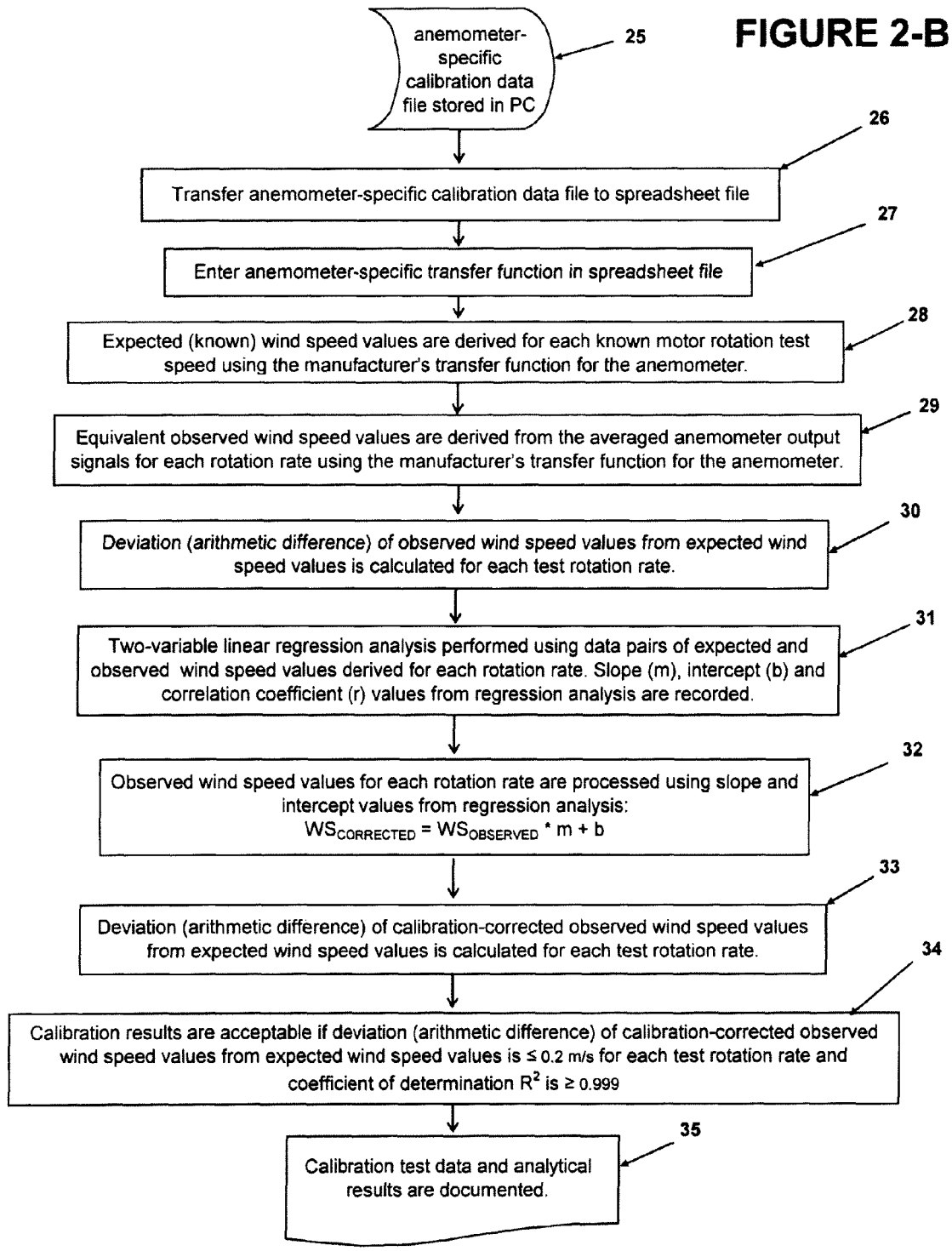

APPARATUS AND CALIBRATION METHOD FOR CUP ANEMOMETERS HAVING NON-REMOVABLE CUPSETS

This patent application claims priority to, and the benefit of, U.S. Provisional Patent Application Ser. No. 61/347,758, filed May 24, 2010 and entitled APPARATUS AND CALIBRATION METHOD FOR CUP ANEMOMETERS HAVING NON-REMOVABLE CUPSETS, the disclosure of which is incorporated herein by reference in its entirety.

FIELD OF THE INVENTION

The present invention relates generally to calibration techniques for anemometers, and more specifically to such calibration techniques for anemometers having cupsets that are not designed for replaceable removal from the anemometer body.

BACKGROUND

Calibration of anemometers supports the validity and defensibility of measurement data produced thereby when utilized in air flow, e.g., wind or air velocity, monitoring applications. Anemometers typically have a number of cups or propellers, either of which is defined for purposes of this document as a cupset. In some such anemometers, the cupset is not designed for replaceable removal from the anemometer body; i.e., the cupset is not designed to be removed from the anemometer body without damaging the anemometer. Conventional calibration methods for such anemometers typically entail a study of the anemometer performance in a well-characterized wind tunnel environment meeting specific requirements. It is desirable be able to produce accurate calibration test data to assess the performance of such anemometers without subjecting the anemometers to wind tunnel testing.

SUMMARY

A candidate anemometer for calibration and a variable speed motor are illustratively secured upon an adjustable test frame. The motor and anemometer may be illustratively positioned on the test frame such that the drive shaft of the motor is perpendicular to and centered upon the upper surface of the hub of the anemometer cup assembly. A short length of rubber or other flexible tubing of appropriate diameter may be used to couple the motor drive shaft to the center point of the cups' assembly hub. The test frame with the mounted motor and anemometer is placed within an airtight enclosure illustratively equipped with internal lights and transparent viewing panels. One or more air-tight, sleeved ports may be installed on one or more panels of the enclosure to allow passage of shielded electrical wiring for operation and control of the motor and lights, and to also allow passage of electrical signal wiring for transmission of the anemometer electrical output signal, from within the enclosure to connect to measurement test equipment located outside the enclosure.

Additionally, enclosure may have an air-tight, bulkhead-mount compression fitting installed through one of the enclosure panels. The interior port of the fitting may be left open to the interior of the enclosure, and the exterior port of the compression fitting may be connected via tubing through, for example, a union tee compression fitting to a vacuum pressure gauge. The third port on the union tee fitting may be connected via tubing to one port of a two-way (open/closed) control valve. The second port of the control valve may be connected via tubing to the inlet of a vacuum pump capable of achieving and maintaining a partial pressure of, for example, approximately 1,600 Pa. When the two-way valve is opened and the pump is activated, the enclosure may thus be evacuated to approximately 1,600 Pa.

A variable-speed motor controller may illustratively be used to activate the motor and rotate the coupled anemometer cup assembly at approximately 10 different speed settings evenly spaced across the range of 140 to 1,000 rpm. At each speed setting, the motor and anemometer cup assembly are illustratively allowed sufficient time to achieve a stable rate of rotation at a designated speed set point (e.g., ±1 rpm), as indicated by the motor controller. When the motor and cup assembly rotation rate is observed to have fully stabilized at each designated rotation rate, e.g., after rotating for a minimum of two minutes at each selected, stable motor speed, the anemometer output signal may be sampled and measured by a calibrated frequency meter at an illustratively minimum rate of five times per second (5 Hz). The frequency measurements may be recorded over an illustratively minimum interval of two minutes while the motor and anemometer cup assembly continue to rotate at the designated motor controller speed set point. The frequency meter may, for example, record the maximum, minimum and average frequency values obtained during each one-second interval. The measurement data recorded at each test speed may, for example, contain a minimum of 120 consecutive averaged frequency values. Each logged frequency value may be an average of 5 individual frequency measurements collected by the frequency meter. These values may be acquired and logged by PC-based software, and this process may be repeated at a total of, for example, 11 different test speeds, simulating wind speeds over a range of approximately 4 to 25 meters per second (m/s). Data collected at each of the 11 test speeds may therefore illustratively represent an average of 600 individual frequency measurements collected over a two-minute interval. The standard deviation of the frequency samples may be determined and recorded.

For each rotation rate, the manufacturer's Standard Transfer Function (or if available, the sensor-specific transfer function) may be applied to the mean output frequency to determine a corresponding wind speed indication. Observed and expected data sets may then be subjected to a conventional regression analysis, e.g., a linear regression analysis. Residual values may then be calculated and reported for each test speed, as well as any deviation of the regression analysis results in comparison to the sensor-specific and/or manufacturer's generic transfer function for the sensor, together with the standard error and coefficient of variance for each test series.

BRIEF DESCRIPTION OF THE DRAWINGS

FIGS. 2-A and 2-B together depict a flowchart illustrating a process for obtaining and analyzing calibration information from a cup anemometer using the test apparatus illustrated in FIG. 1.

DESCRIPTION OF THE ILLUSTRATIVE EMBODIMENTS

Figure 1:
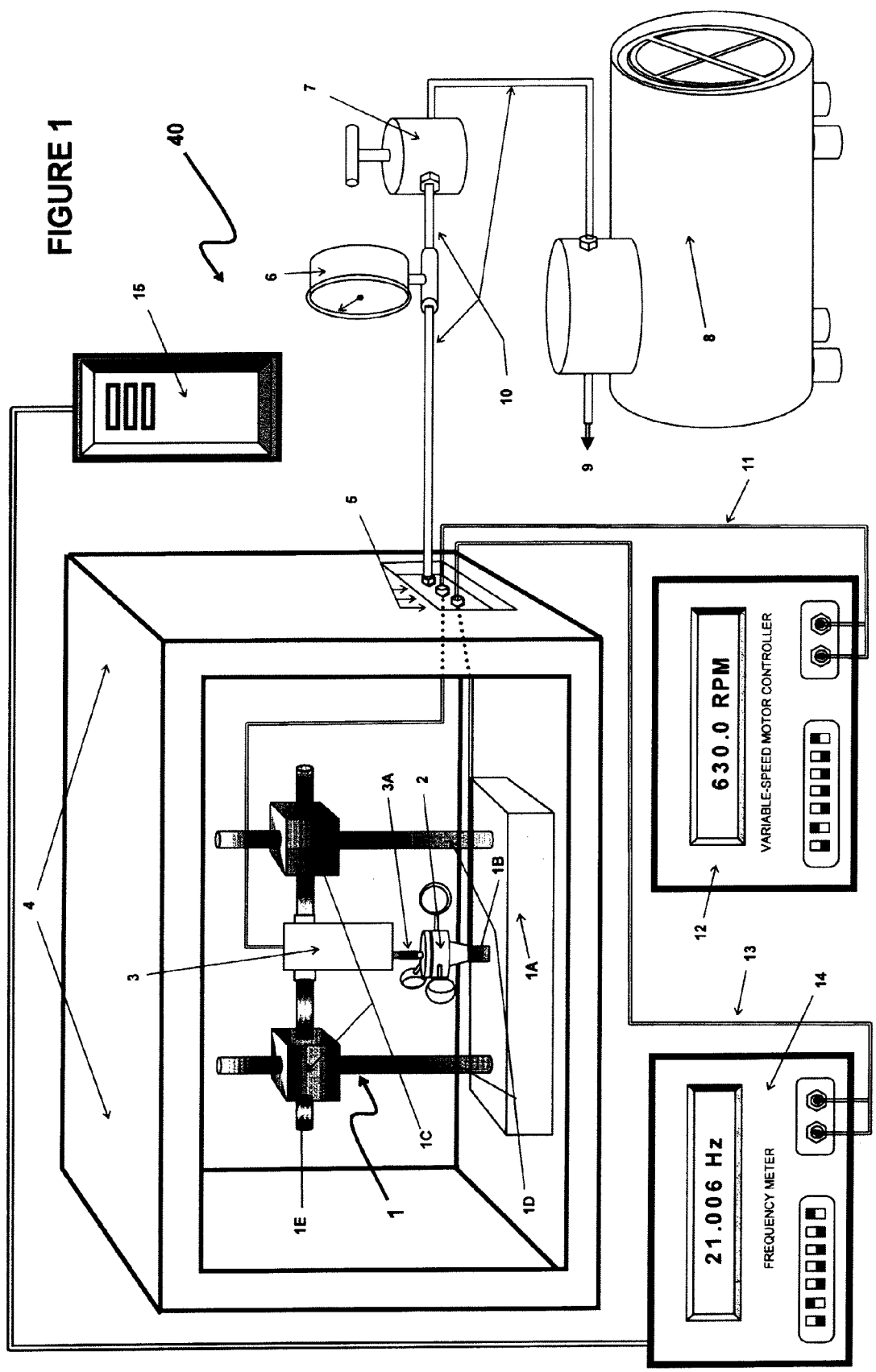
FIG. 1 depicts an apparatus for obtaining calibration information from a cup anemometer.

For the purposes of promoting an understanding of the principles of the invention, reference will now be made to a number of illustrative embodiments shown in the attached drawings and specific language will be used to describe the same.

Referring now to FIG. 1, one illustrative embodiment of a system 40 depicting an apparatus employed for implementation of the calibration method is shown. In the illustrated embodiment, the system 40 includes one illustrative embodiment of an adjustable frame assembly 1, constructed of sturdy and rigid materials that include frame base plate 1A, post 1B, frame union cross-drilled and tapped members 1C, frame vertical members 1D and frame horizontal member 1E. The illustrative embodiment of frame assembly 1 features the capability of adjusting and fixing both the vertical height and lateral position of frame horizontal member 1E with respect to frame base plate 1A and post 1B.

Frame assembly 1 provides a rigid and adjustable platform for attachment and alignment of an anemometer to be calibrated 2 and a variable-speed motor 3. Anemometer 2 is rigidly mounted upon post 1B, which projects vertically from the frame base plate 1A. The physical dimensions of post 1B are determined by the mounting requirements of anemometer 2. In the illustrative embodiment, Anemometer 2 is of a design that does not permit ready removal and reattachment of the cups assembly. In one illustrative implementation, example performance specifications for variable-speed motor 3 and motor controller 12 for producing acceptably accurate anemometer calibration test data may include, but should not be limited to:

- Minimum motor/motor controller operating range extends from 100 to 1,000 rpm.
- Motor/motor controller speed is adjustable throughout the stipulated operating range in increments $\leq 10$ rpm.
- Motor torque throughout the stipulated operating range is $\geq 1.7$ oz-in.
- Motor speed accuracy at any selected speed setting throughout the operating range is $\leq \pm 1$ rpm.
- Variability of motor speed at any selected speed setting throughout the operating range is $\leq \pm 1$ rpm.
- Motor physical dimensions and mechanical design are compatible with mounting on frame horizontal member 1E, vertical positioning and alignment above mounted anemometer 2, and general compatibility for operation within test enclosure 4.

A length of rubber tubing 3A having example dimensions of approximately 1 inch in length and an example inside diameter approximately equal to the outer diameter of the shaft of variable-speed motor 3 is mechanically connected to the shaft of variable-speed motor 3 by forcing it, for example, approximately ¼-to ½-inches onto the end of the shaft of variable-speed motor 3. Variable-speed motor 3 with attached tube connector 3A is then mounted on frame horizontal member 1E. The height of frame horizontal member 1E is adjusted by loosening set screws in frame union members 1C to produce clearance above frame base plate 1A. Anemometer 2 is then rigidly mounted upon post 1B. The height of Frame horizontal member 1E above frame base plate 1A is then adjusted to lower the variable speed motor 3 until the tip of rubber tubing connector 3A contacts the top center surface of the cups assembly hub of anemometer 2. The set screws in frame union members 1C are then tightened to secure frame horizontal member 1E in this position. Adjustment to the lateral position of variable-speed motor 3 on frame horizontal member 1E can then be made to center the tip of connector 3A directly on the top center surface of the cups assembly hub of anemometer 2. Upon centering the tip of tube connector 3A as described, the position of variable-speed motor 3 is fixed upon frame horizontal member 1E.

If the top surface of the cups assembly hub of anemometer 2 has an extruded form projecting upward from the center, rubber tubing connector 3A may be forced onto the extrusion to form the mechanical link necessary to transfer the torque of variable-speed motor 3 to the cups assembly of anemometer 2. If there is no extrusion projecting upward from the center of the top surface of the cups assembly hub, rubber tubing connector 3A may be temporarily connected to the center of the top surface of the cups assembly hub using removable adhesive mastic.

To obtain calibration data of acceptable accuracy, frequency meter 14 has features and performance specifications that illustratively equal or exceed the following:

- Microprocessor-controlled sample rate $\geq 0.2$ Hz (i.e., five or more frequency measurements made each second on test input signals).
- Microprocessor-controlled automatic 1-second averaging of input signal frequency measurements.
- Microprocessor-controlled automatic storage in internal electronic digital memory of up to 995 averaging interval values.
- Microprocessor-controlled digital communication firmware that transfers upon request real-time and historical (stored) measurement data to a separate and independent electronic data file created using compatible application software that runs on a personal computer (PC-type) operating system environment.
- Input impedance $\geq 10$ megohms and $\leq 10$ picofarads.
- Input signal sensitivity $\leq 5$ millivolts.
- Minimum frequency measurement range of 0.5 Hz to 50 KHz for stated input sensitivity.
- Frequency measurement accuracy equal to or better than 0.0050%+1 digit.
- Frequency measurement resolution equal to or better than 0.01 Hz for input signals $\leq 500$ Hz.
- Operating environment range equal to or better than −20° C. to 55° C. for temperature and 0% to 90% (over an operating temperature range of 0° C. to 35° C.) for relative humidity.
- Electromagnetic compatibility for susceptibility and emissions: commercial limits per EN61326-1.
- Certified CSA per standard CSA/CAN C22.2 No. 1010.1-92 and UL per standard UL 3111 TÜV per standard EN 61010 Part 1-1993.

Electrical power and control cable 11 for variable-speed motor 3 connects in a conventional manner to variable-speed motor controller 12. Additionally, two of the wires contained in low-voltage electrical cable 13, consisting of four insulated stranded wire inner conductors surrounded by a shielding conductor and outer PVC insulating jacket, are connected at one end to the output signal terminals of anemometer 2 and at the other end to the input terminals of frequency meter 14. While not depicted in FIG. 1, some anemometers to be calibrated may require an electrical power source to operate. The additional wires in electrical cable 13 may be connected to a suitable power source and corresponding power input terminals on anemometers that so require. Electrical cable 15A is connected in a conventional manner between frequency meter 14 and personal computer (PC) 15 running application software that communicates with frequency meter 14 for purposes of acquiring, logging and saving frequency measurement values in a user-accessible data base file format. The application software further permits the user to electronically export recorded measurement data to commercially-available spreadsheet application software for further processing of the data.

Enclosure 4 in FIG. 1 represents an air-tight box having example dimensions approximately equal to 30 inches long by 18 inches high and 18 inches deep. Air-tight enclosures having modified or dimensions other than those described may also be used for the purpose of System 40. In this instance, enclosure 4 is constructed of 7-gauge mild sheet steel double-welded (with the exception of the front panel of the enclosure) to an internal box frame constructed of double-welded 1-inch by ¾-inch mild steel bar stock. All welds for the box frame are ground smooth. The frame and sheet steel sides of the enclosure are reinforced for strength against deformation under vacuum pressure using 1-inch by %-inch mild steel bar stock cut to length and welded across the interior surface of each enclosure panel and also welded to corresponding points where the reinforcing bar abuts the internal frame. Each 18-inch by 18-inch side panel has a single reinforcing bar positioned vertically at the center of the panel. With the exception of the front panel of the enclosure, each 18-inch by 30-inch has two reinforcing bars spaced equally across the length of the panel.

The front panel of the enclosure is fitted with the described reinforcing bar stock positioned to both reinforce the interior surface of the front panel and provide a full supporting framework for two glass windows set into the front panel for observation of the apparatus within the enclosure. The approximate dimensions of the glass windows are 10 inches by 10 inches. The glass used for the enclosure windows is approximately ½-inch thick.

Each of the four upper interior corners of enclosure 4 is fitted with a miniature, low-voltage LED lighting fixture (not shown in FIG. 1). Insulated wiring installed onto the top enclosure frame members interconnects and delivers power to the four lighting fixtures.

The front panel only of enclosure 4 is not welded to the enclosure frame or any other constituent components of enclosure 4, but is instead is designed to be completely removed and reinstalled in its entirety from enclosure 4, thereby permitting access to the enclosure interior for placement of adjustable frame assembly 1, variable-speed motor 3 and connector 3A, anemometer 2 and access for attaching/detaching wiring connections for electrical cables 11 and 13 as necessary. The front panel has a total of eight holes drilled approximately ½-inch from the edges and located at evenly-spaced intervals along all four edges of the panel as follows: one hole located at each corner, two additional holes along each of the top and bottom edges of the panel at evenly spaced distances from the corners, and one additional hole along each side edge of the panel located equidistant from the corners. The front surfaces of the front frame of enclosure 4 are drilled at the same locations as the holes in the front panel. ⅜-inch, machine-threaded steel bolts are welded into the holes drilled in the front face of the enclosure front frame such that the threaded ends of each bolt projects perpendicularly approximately 1½ inches (outward-facing) from the front surface of the frame. A high-density, compressible neoprene gasket is installed along the entire perimeter of the front face of the front panel frame of the enclosure. The front panel is installed on enclosure 4 by aligning the frame bolts with the holes on the edges of the front panel and then seating the front panel against the gasket installed on the perimeter of the front panel frame. The front panel is secured to the frame and enclosure using washers and nuts tightened onto the eight threaded ends of the bolts. Compression of the neoprene gasket between the perimeter of the front panel and the surface of the front panel frame produces an air-tight seal. Removal of the front panel is accomplished by performing the installation procedure in reverse order, however, in the case where partial pressure conditions are extant within enclosure 4, the interior volume of enclosure 4 must be allowed to equalize with ambient pressure conditions before attempting to remove the front panel. Pressure equalization is accomplished by allowing air to enter enclosure via the double-ended shutoff valve fitting installed on connection panel 5.

Recessed connection panel 5, illustratively constructed from 7-gauge sheet steel with approximate dimensions of six inches long, three inches high and three inches deep, is double-welded into an identically-sized rectangular cut out in a side panel of enclosure 4. Connection panel 5 is drilled and fitted with sleeved steel ports that permit air-tight passage and communication from the interior to the exterior of enclosure 4 of electrical wiring cables 11 and 13 as well as the power cable for the interior lighting fixtures (not shown in FIG. 1). Excess space in the sleeves of these ports is illustratively filled with epoxy resin to ensure enclosure 4 is air-tight. Connection panel 5 is additionally drilled and fitted with a bulkhead-mount, stainless steel, quick-connect port fitting featuring an integrated, automatic leak-tight double-ended shutoff valve. The female port fitting accepts a matching male quick-connect compression tube fitting. Tubing 10 consists of suitable lengths of ¼-inch outer diameter thick-wall flexible Teflon tubing. All connections for tubing 10 are made using suitably-sized, leak-tight brass or stainless steel compression tube fittings. Tubing 10 makes a leak-tight pneumatic connection from the quick-connect male fitting on connection panel 5 to a three-way compression tube union fitting, one port of which is connected to pressure gauge 6. Pressure gauge 6 has a measurement range of, for example, 0 kPa to 2 kPa. Tubing 10 further provides a leak-tight pneumatic connection from the three-way tube union fitting to both port fittings on two-way manual shutoff control valve 7 and between control valve 7 and the inlet port fitting of vacuum pump 8. Vacuum pump 8 is an oil-free rotary vane or diaphragm pump capable of a nominal volumetric flow rate of 10 to 20 liters per minute (LPM) and maintaining a partial pressure of 1,600 Pa. The air stream 9 from the exhaust port of vacuum pump 8 is directed to room air.

The system 40 is initially tested by assembling the constituent components as described above and represented in FIG. 2-A, steps 16 through 19. Variable-speed motor 3, connect 3A and anemometer 2 installed onto and properly aligned on adjustable frame assembly 1 as described above are collectively placed in the approximate center of the bottom interior panel of enclosure 4. Electrical wiring connections are made to anemometer 2, frequency meter 14, motor controller 12 and PC 15 are established using electrical wiring cables 11, 13 and 15A respectively, as described above. PC 15 is powered up, the application software that communicates with frequency meter 14 is opened within the PC operating system and a unique electronic data file is created and initialized using the application software for purposes of acquiring and recording calibration data for anemometer 2. The current date, time, laboratory location, test instrument identification information, operator name and anemometer identification information are entered by the operator into designated fields in the application software data file. The front panel of enclosure 4 is installed and secured as described above. Leak-tight, closed pneumatic flow connections are established between the double-ended shutoff valve installed on connection panel 5 to pressure gauge 6, control valve 7 and vacuum pump 8 using compression fittings and appropriate lengths of tubing 10, also as described above.

As called out in FIG. 2-A, step 20, manual valve 7 is opened and vacuum pump 8 is energized, thereby initiating evacuation of the air within enclosure 4. After an interval of, for example, approximately 10 to 15 minutes, pressure gauge 6 will indicate a partial pressure of approximately 1,600 Pa within enclosure 4. Control valve 7 is now manually closed to seal the air-tight pneumatic system represented by the interior environment contained within enclosure 4, the double-ended shutoff valve installed in connection panel 5, pressure gauge 6, control valve 7 and those segments of tubing 10 used to interconnect these components. Vacuum pump 8 is now de-energized. The pressure reading indicated on pressure gauge 6 is recorded. Approximately 10 minutes after closing control valve 7 and de-energizing vacuum pump 8, the pressure reading on pressure gauge 6 is read to confirm the pressure agrees within 10 Pa of the pressure gauge reading recorded 10 minutes previously, indicating no significant leaks are extant within the enclosure 4 and system 40.

As called out in FIG. 2-A, step 21, motor controller 12 is now energized and the motor rotation set to a relatively low speed within the range of, for example, 140 rpm to 230 rpm. As variable speed motor 3, connector 3A and anemometer 2 cups assembly commence rotating and rapidly stabilize at the rotation rate set on motor controller 12, the operator observes connector 3A for any visible indication of eccentric motion as it rotates. Eccentric motion observed in connector 3A may indicate incorrect positioning or a fault in the mechanical coupling established between connector 3A and the top center of the hub of anemometer 2 cups assembly and/or the shaft of variable speed motor 3. Any observable eccentricity in connector 3A as it rotates must be corrected prior to commencing collection of calibration data for anemometer 2. Corrective actions may include, but are not necessarily limited to:

- Adjusting the mounting location of variable speed motor 3 on horizontal member 1E of frame assembly 1 to correct off-center vertical alignment of the shaft of variable speed motor 3 relative to the center of the hub of the cups assembly of anemometer 2.
- Replacement of connector 3A if there is any observable curvature along its length.
- Re-seating connector 3A on the shaft of variable-speed motor 3.
- Re-positioning the mechanical coupling between the lower tip of connector 3A and the center of the hub of the cups assembly of anemometer 2.

Upon confirmation that connector 3A exhibits no visible evidence of rotational eccentricity and upon further confirmation that the actual rpm of motor 3 as indicated by motor controller 12 has stabilized at the rate selected by the operator and the variance of motor 3 actual rpm is $\leq \pm 1$ rpm, the operator initiates data collection by the PC-based application software of anemometer 2 output signal frequency continuously over a time interval of, for example, at least two full minutes duration. During the two minute test interval, the application software acquires and records 120 discrete, one-second mean (averaged) frequency values. Each one-second mean frequency value is calculated by the microprocessor within frequency meter 12 fusing a minimum of five instantaneous samples collected every second by frequency meter 12 as it samples the output signal from anemometer 2. The 120 mean frequency values recorded by the PC-based application software therefore represent a minimum of 600 discrete measurements of the anemometer 2 output signal under the described test condition. The operator now exports the data recorded in the frequency meter application software file to a worksheet in a separate electronic file created using commercially-available spreadsheet application software.

The arithmetic mean ($Hz_{AVG}$) of the recorded frequency data values $x_i$ (n=number of recorded data values) is determined using Equation 1:

$$Hz_{AVG} = \overline{X} = \frac{1}{n}\sum_{i=1}^{n} X_i \quad \text{Equation 1}$$

The standard deviation (SD) of the recorded frequency data values (n=number of recorded data values) is determined using Equation 2:

$$SD = \sqrt{\frac{\sum_{i=1}^{n}(x_i - \overline{x})^2}{n-1}} \quad \text{Equation 2}$$

For the just-completed pre-calibration test with the motor controller 12 rpm rate set within the range of, for example, 140 rpm to 230 rpm, as called out in FIG. 2-A, step 22, the value of SD as calculated from the anemometer output frequency measurement data set recorded over a minimum two-minute interval is normally expected to be $\leq 0.2$ Hz, based on empirical observations of calibration data obtained and recorded for a number of anemometers in good operating condition. If this is not the case, as called out in FIG. 2-A, step 23, the rotation speed stability of motor 3 should be investigated and corrective actions taken as indicated by the results of the investigation. If motor 3 speed stability is confirmed to be $\leq \pm 1$ rpm variance from the desired rotation rate entered on motor controller 12, then also as called out in FIG. 2-A, step 23, the starting torque threshold of anemometer 2 should be evaluated for conformance with the anemometer manufacturer's specification using a calibrated torque meter and equation 3:

$$T = Ku^2 \quad \text{Equation 3,}$$

where T=maximum starting torque (gm-cm) specification for anemometer, $u^2$=the square of anemometer threshold wind speed (u specified by manufacturer) and K=aerodynamic constant for anemometer (K specified by manufacturer).

The maximum measured starting torque values for anemometer 2 obtained for both clockwise and counter-clockwise directions of rotation are recorded by operator in designated fields on the PC spreadsheet calibration data file. A note is entered into the field provided on the spreadsheet calibration data file as to whether the starting torque measurements for the anemometer under test meet manufacturer specifications.

Upon confirming proper setup and completing operational checks described above, calibration of anemometer 2 can proceed as called out in the illustrated embodiments represented in FIG. 2-A, step 24. The calibration of the candidate anemometer is performed in accordance with the methods and procedures described above, excepting those procedures that pertain to preliminary evaluation of the proper operation and performance of System 40, and also those procedures describing associated investigative and corrective actions. When proceeding with calibration of a candidate anemometer, those procedures are unnecessary because potential performance issues for preparing and ensuring the proper performance of the apparatus and anemometer represented in FIG. 1 as System 40 have been identified and remedies discussed and implemented in accord with steps 17 through 23 in the flowchart presented as FIG. 2-A.

The method and procedures for calibrating a candidate anemometer described herein call for subjecting the candidate anemometer to controlled test conditions consisting of discrete rotation speeds that simulate known wind speeds spanning the range of, for example, approximately 4 m/s to 26 m/s. Although subjecting the candidate anemometer to approximately 10 rotation speeds representing wind speeds within the referenced range is commonly practiced, the invention and calibration method represented and described herein is not limited to this practice, and the method and procedures may be modified as appropriate to incorporate a greater or lesser number of simulated wind speeds and/or a broader or more restrictive range of simulated wind speeds than those referenced above and described in detail for illustrative purposes here.

In the instance of calibrating a candidate anemometer under controlled test conditions consisting of discrete rotation speeds that simulate known wind speeds spanning the range of approximately 4 m/s to 26 m/s, the operator determines in advance the rotation rates required of motor 3 to rotate the anemometer cups assembly at speeds representing the desired range of simulated wind speeds. Furthermore, the rotation rates for motor 3 are typically determined such that the associated known wind speeds are evenly distributed across the desired range, although the method is not limited to this practice and, in some circumstances, the preponderance of, or additional rotation rates may be determined for use that are concentrated within a range of equivalent known wind speeds of special and specific interest.

The transfer function specific to the anemometer to be calibrated is used to calculate the motor rotation speeds. An example of a typical format employed to expresses an anemometer transfer function is presented as equation 4:

$$u = fm + b \qquad \text{Equation 4}$$

where u=wind speed expressed in engineering measurement units (e.g., m/s, mph, etc), f=anemometer output signal frequency in Hz, m=the constant slope value of the anemometer transfer function, and b=the constant intercept value of the anemometer transfer function.

For anemometers designed to generate pulsed output signals by mechanically coupling the rotation of the cups assembly (or a propeller) to rotate a multi-pole magnet within a field coil, the number of poles on the magnet employed in the anemometer will determine the number of frequency cycles generated in the anemometer output signal during course of a single complete rotation of the magnet (and hence, one complete rotation of the mechanically-coupled anemometer cups or propeller assembly). A four-pole magnet will generate two complete frequency cycles during one complete revolution within a field coil. A six-pole magnet will generate three complete frequency cycles during one complete revolution within a field coil. For anemometers designed using this principle, the output signal frequency f, in Hz, produced by an anemometer having a four-pole magnet rotating within a field coil can be calculated using equation 5:

$$f = \left(\frac{\text{rpm}}{60}\right) \times 2 = \frac{\text{rpm}}{30} \qquad \text{Equation 5}$$

Using the relationships expressed in Equations 4 and 5, the known rotation rate (in rpm) for an anemometer that incorporates a four-pole magnet rotating within a field coil at a given wind speed can be calculated by substituting (rpm/30) for the term f described in Equation 4 as presented in equation 6:

$$u = \frac{\text{rpm}}{30}(m) + b;$$
$$\therefore \text{rpm} = \left(\frac{u(30)}{m}\right) - b \qquad \text{Equation 6}$$

Equation 6 can be employed to calculate the exact rotation rates to be entered by the operator in motor controller 12 to cause motor 3 to spin anemometer 2 at the rotation speeds necessary to simulate known wind speeds spanning the desired calibration range. Known equations of similar structure can be derived for anemometers that utilize multi-pole magnets having more (or less) than four poles rotating within a field coil.

To further illustrate as a practical example use of equation 6 to implement calibration step 24 as represented in FIG. 2-A, Table 1 lists in column A eleven rotation rates calculated for illustrative purposes. The calculated rotation rates can be entered in motor controller 12 to cause motor 3 to rotate at the calculated rates which correspond to known wind speeds for a cup anemometer having a transfer function wherein the value of slope m is equal to 0.765 and the value of intercept b is equal to 0.35. Column B in Table 1 lists for illustrative purposes the known wind speed values corresponding to the rotation rates listed in column A. In this illustrative example, step 24 as represented in FIG. 2-A is manually implemented using the fully-prepared assembly 40 as represented in FIG. 1 to sequentially subject anemometer 2 to the controlled and stable rates of rotation listed in column A of Table 1.

To continue illustrating by way of example the implementation of calibration step 25 as represented in FIG. 2-B, for each of the eleven stable rates of motor rotation, the operator manually initiates transmission of the corresponding measured output signal frequency test data from frequency meter 12 to the application software running on a PC. The frequency measurement data are recorded in eleven unique files created by the operator using the capabilities resident in the application software to identify the corresponding rotation rate associated with each of the 11 sets of recorded frequency data. The mean average and standard deviation (SD) values for the 1-second averaged frequency data corresponding to a test condition represented by a given motor 3 rotation rate are calculated by the application software. These calculated values are recorded and stored within each unique data file created for recording the anemometer calibration data. For each controlled test condition producing recorded frequency test data corresponding to a specific rate of motor 3 rotation, the application software further logs the date and time each one-second averaged frequency data value was acquired and recorded, the duration of the time interval represented by each recorded average frequency data value, the total number n of individual average frequency data values recorded during each controlled test condition corresponding to a specific rate of motor 3 rotation and also the maximum and minimum average frequency data values recorded during each controlled test condition corresponding to a specific rate of motor 3 rotation.

As called out in step 26 as represented in FIG. 2-B, the operator now creates a unique electronic file using commercially-available spreadsheet software and exports the mean measured average frequency data values and associated SD values recorded in step 25 to the electronic spreadsheet file. In support of the example case for anemometer calibration discussed herein, Table 1 lists eleven mean average anemometer frequency data values in column C and associated SD values in column D as exported from the eleven application software files to the electronic spreadsheet file.

As called out in step 27 as represented in FIG. 2-B, the operator now enters in designated fields in the spreadsheet file the anemometer-specific transfer function equation and associated constants defined by the anemometer manufacturer for the slope m value and intercept b value for the anemometer-specific transfer function. An example anemometer transfer function and values illustrative of slope m and intercept b are presented in Table 1 in support of the example case for anemometer calibration discussed herein.

Step 28 as represented in FIG. 2-B calls out for recording in the electronic spreadsheet file the known equivalent wind speed values calculated using the known motor 3 rotation rate (in rpm) entered by the operator in motor controller 12 to produce each of the controlled motor rotation test conditions performed in step 24. The equivalent known wind speed values are calculated in accord with equation 6. The equivalent observed wind speed values are recorded in designated fields in the electronic spreadsheet file. Values illustrative of equivalent known wind speeds are listed in column B of Table 1 in support of the example case for anemometer calibration discussed herein.

Step 29 as represented in FIG. 2-B calls out for recording in the electronic spreadsheet file equivalent anemometer-indicated wind speed values calculated from the average frequency values obtained from the anemometer 2 output signal during each of the controlled motor rotation test conditions performed in step 24. The equivalent wind speed value for each recorded average frequency value is calculated in accord with equation 4. The equivalent observed wind speed values are entered and saved in designated fields in the electronic spreadsheet file. In support of the example case for anemometer calibration discussed herein, column E in Table 1 lists eleven example values illustrative of equivalent observed wind speeds.

Step 30 as represented in FIG. 2-B calls out for calculating the deviation of each equivalent anemometer-indicated (observed) wind speed value recorded in step 29 from the corresponding known wind speed value recorded in step 28. Calculation of this deviation is made by subtracting the known wind speed value recorded in step 28 from the corresponding anemometer-indicated (observed) wind speed value recorded in step 29. The deviation (arithmetic difference) values are entered and saved in designated fields in the electronic spreadsheet file. In support of the example case for anemometer calibration discussed herein, column F in Table 1 lists eleven example values illustrative of deviation (arithmetic difference) values obtained by subtracting the values listed in column E in Table 1 from corresponding values listed in column B in Table 1.

Step 31 as represented in FIG. 2-B calls out for using two-variable ordinary least squares (OLS) linear regression analysis of the anemometer calibration test data to determine a statistically valid quantifiable relationship between the anemometer-indicated (observed) wind speed data and corresponding known wind speed data based on a best-fit line determined from the results of the linear regression analysis. The linear regression analysis is performed using paired data values, each data pair consisting of an anemometer-indicated (observed) wind speed value (treated as the dependent variable $y_i$) and a corresponding known wind speed value (treated as the independent variable $x_i$). The linear regression analysis is performed in accord with equation 7:

$$\hat{B}_2 = \frac{\sum x_i \cdot y_i}{\sum x_i^2},$$ Equation 7 and $$\hat{B}_1 = \overline{Y} - \hat{\beta}_2 \overline{X}$$

where $x_i = (X_i - \overline{X})$ and $y_i = (Y_i - \overline{Y})$.

The coefficient of determination ($R^2$) is calculated for the analysis results as a determinant of the "goodness of fit" of the linear analysis. Generally, the value of $R^2$ should be $\geq 0.999$ for the calibration relationship to be considered valid. The coefficient of determination ($R^2$) is calculated in accord with equation 8:

$$R^2 = \Sigma(Y_i - \overline{Y})^2 = \Sigma(Y_i - \hat{Y}_i)^2 + \Sigma(\hat{Y}_i - \overline{Y})^2$$ Equation 8

OLS linear regression analysis results express the relationship between a known wind speed value x and the corresponding wind speed indication predicted for anemometer in an equation in the following form:

$$y' = mx + b$$ Equation 9 where y'=wind speed indication predicted for anemometer 2 for wind speeds values within the range of equivalent known wind speed values produced in step 24 as represented in FIG. 2-A of the calibration test method, x=a known wind speed value within the range of equivalent known wind speed values produced in step 24 as represented in FIG. 2-A of the calibration test method, m=the value of the slope of the best-fit line determined from linear regression analysis of the calibration test data, and b=the value of the intercept of the best-fit line determined from linear regression analysis of the calibration test data.

Equation 9 expresses the unique and useful calibration relationship specific to, and established for, the anemometer calibrated using the described invention and method expressed in the illustrated embodiments represented in FIG. 1 as System 40, FIGS. 2-A, 2-B and the procedures, notes and method described herein. The values m, b and $R^2$ are recorded and stored in designated fields in the electronic spreadsheet file created for recording and analyzing the anemometer calibration data.

Step 32 as represented in FIG. 2-B calls out for using equation 9 to calculate the value of y' for each anemometer-indicated (observed) wind speed value recorded in step 29. The y' values are recorded and stored in designated fields in the electronic spreadsheet file created for recording and analyzing the anemometer calibration data.

Step 33 as represented in FIG. 2-B calls out for calculating the deviation of each predicted wind speed value y' calculated and recorded in step 32 from the corresponding known wind speed value recorded in step 28. Calculation of this deviation is made by subtracting the known wind speed value recorded in step 28 from the corresponding predicted wind speed value y' recorded in step 32. The deviation (arithmetic difference) values are entered and saved in designated fields in the electronic spreadsheet file.

Step 34 as represented in FIG. 2-B calls out for evaluating the deviation values calculated and recorded in step 33 against criteria established for acceptable magnitude of the deviations values. Generally, the absolute magnitude of the deviation values calculated and recorded in step 33 should be $\leq 0.2$ m/s for the calibration relationship established in step 31 to be considered useful.

Step 35 as represented in FIG. 2-B calls out for documentation to be produced detailing the calibration data and analytical results. Such documentation may be tailored to the needs and interest of the end user of the calibration data, and may include both tabular and graphical depictions and representations of the calibration data and analytical results.

TABLE 1

Example Calibration Test and Analytical Data for Illustrative Purposes

| Transfer function for anemometer: $u$ (in m/s) = fm + b | | | Slope m = 0.765 | Intercept b = 0.350 | |
|---|---|---|---|---|---|
| A<br>Known Cups<br>(Motor 3)<br>Speed<br>(rpm)<br>(Equation 6) | B<br>Known Wind<br>Speed<br>(m/s)<br>(Equation 6;<br>m = 0.765;<br>b = 0.35) | C<br>Mean Measured<br>Frequency f<br>from<br>Anemometer 2<br>(Hz)<br>(Equation 1) | D<br>SD of 1-second<br>averaged f<br>Measurement<br>Data<br>(Equation 2,<br>n = 120) | E<br>Anemometer-<br>Indicated Wind<br>Speed (m/s)<br>(Equation 4,<br>m = 0.765;<br>b = 0.35) | F<br>Deviation of<br>Observed<br>from Known<br>(m/s)<br>(= E − B) |
| 140 | 3.892 | 4.758 | 0.19093 | 3.961 | 0.069 |
| 180 | 4.904 | 6.082 | 0.15218 | 4.966 | 0.062 |
| 270 | 7.181 | 8.947 | 0.09594 | 7.141 | −0.040 |
| 360 | 9.458 | 11.994 | 0.02015 | 9.453 | −0.005 |
| 450 | 11.735 | 15.018 | 0.03453 | 11.749 | 0.014 |
| 540 | 14.012 | 18.026 | 0.03340 | 14.032 | 0.020 |
| 630 | 16.289 | 21.006 | 0.03109 | 16.293 | 0.004 |
| 720 | 18.566 | 23.999 | 0.02032 | 18.565 | −0.001 |
| 810 | 20.843 | 27.007 | 0.03955 | 20.849 | 0.006 |
| 900 | 23.120 | 30.011 | 0.01596 | 23.129 | 0.009 |
| 990 | 25.397 | 33.002 | 0.00798 | 25.399 | 0.002 |

Anemometers that utilize different techniques to transform the rotation rate of a cups (or propeller) assembly to an electrical signal that possesses a measurable and quantifiable characteristic that varies proportionately with the rotation rate of a cups (or propeller) assembly are inherently amenable to analytical techniques that can accurately determine by calculation the correct rotation rate of the cups (or propeller) assembly associated with a known wind speed. One example of a different anemometer technology utilizes an internal slotted disk that is mechanically coupled to the rotating motion of the cups (or propeller) assembly. As the slotted disk rotates, it interrupts a light source at a rate proportionate to the rotation rate of the cups (or propeller) assembly. The resulting pulsed light signal is detected by an internal photo diode and subsequently processed via internal electronic components to produce either a pulsed frequency output signal or an analog voltage or current output signal, all forms of which are proportionate to the instantaneous wind speed. The example is provided to affirm the claim in principle that the illustrated embodiments represented in FIG. 1 as System 40 and in FIGS. 2-A and 2-B can be successfully applied to calibrate any cups or propeller-type anemometer that produces an electrical output signal possessing a measurable and quantifiable characteristic that varies in a predictable manner proportionate to the rotation rate of the cups (or propeller) assembly. In cases where the anemometer electrical output signal is a varying DC voltage or current, a suitably accurate and sensitive DC voltmeter or current meter would be used in lieu of frequency meter 12 to accurately measure and record the anemometer output signal as the anemometer cups (or propeller) assembly is rotated at specific rates by motor 3 and motor controller 1.

The anemometer cups assembly is mechanically affixed to the upper end of a perpendicular central shaft located within the body of the anemometer. A 4-pole (or alternatively, 6-pole) magnet, also enclosed within the anemometer body, is mechanically affixed to the lower end of the central shaft. The entire cups/shaft/magnet assembly characteristically has a low starting torque threshold, due to the support of low-friction bearings located at the upper and lower ends of the central shaft. The mechanical coupling of these components ensures that the rotational rate of the central shaft and multi-pole magnet is identical to rotational rate of the cups assembly. The multi-pole magnet is enclosed within a wire winding, into which an alternating current is induced as the cups (and multi-pole magnet) are rotated. For each rotation of a 4-pole magnet, two complete cycles of an alternating electrical current are induced in the coil windings (three cycles are induced for each revolution of a 6-pole magnet). The electrical current represents the anemometer output signal, which is normally transmitted to a device that detects and converts the number of cycles per second (frequency, f) produced by the anemometer to an equivalent value of wind speed, expressed in equivalent engineering measurement units.

Therefore, the frequency (f) of the anemometer output signal is directly proportionate to the rotational rate (in rpm) of the cups assembly. The method provided for anemometer calibration is the conversion of rate of rotation of the cups assembly to the corresponding electrical output signal converted to engineering measurement units of equivalent wind speed. This is accomplished by applying the anemometer manufacturer's transfer function which relates frequency (f) or revolutions per minute (rpm) or other type of electrical output signal having a defined range to equivalent expected wind speed (expressed in engineering measurement units). The accuracy of the anemometer is determined by turning the anemometer cups assembly at several accurately known, precise and stable rates of rotation. For each rotational rate, the anemometer output signal is scanned and measured at a minimum rate of five times each second (5 Hz) using calibrated electronic test equipment. The measured values are then recorded in an electronic database, and the recorded values are then statistically analyzed. The analysis results are then compared to the expected output and an assessment of agreement with respect to tolerance specification is made.

The calibration apparatus provides an evacuated chamber (maintained at a pressure of 1,600 Pa, ±160 Pa) in which the anemometer is enclosed during the calibration process. The rotational rate of an anemometer for which the cups assembly cannot be readily removed is accurately achieved and maintained using a low-torque, variable-speed motor due to the fact that the evacuated chamber effectively eliminates drag effects that would otherwise be produced by the cups assembly as it rotates during the calibration tests.

Although not necessary, optional incorporation of "as installed" signal transmission wiring and the local data acquisition system (DAS) used for the wind speed measurement system is preferred as additional components in the signal chain for calibration assessment.

The described apparatus and calibration method produces accurate calibration test data to assess the performance of cup and propeller-type anemometers of a variety of manufacturers by comparing the measured and appropriately-scaled electrical output signals obtained from an anemometer while the cups assembly is being rotated at a number of precisely known rates of rotation. Accurate calibration test data can be obtained using the described method and apparatus for cup anemometers that are not designed for ready removal and reattachment of the cups assembly. This is made feasible by enclosing the anemometer to be calibrated in an evacuated test chamber while imparting known rotation rates to the cups assembly. The stable low pressure conditions extant within the evacuated test chamber housing the anemometer under test minimize drag effects that would otherwise be produced by the rotating cupset under normal atmospheric conditions. Such drag effects would otherwise prevent or make it very difficult to maintain stable, accurate and precisely known rotation rates. The described low-pressure test environment for anemometers reduces drag effects from the attached cupset to negligible values, thereby allowing the anemometer cups/propellers and other moving parts to be rotated at known speeds within the range of approximately 140 to 1,000 rpm with a variance of ±1 rpm at a given rotation set point. For most commercially-available cup anemometers, for example, the specified rotation rate range of 140 to 1,000 rpm corresponds to equivalent wind speed values of approximately 4 meters per second (m/s) to 26 m/s. Calibration test data within this range of wind speeds is of primary interest and use for wind energy assessment monitoring programs, and the disclosed calibration method and apparatus is therefore particularly well-suited for anemometers used for these purposes.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An apparatus for generating calibration data for a cup anemometer having a non-removable cupset, the apparatus comprising:
   an airtight enclosure,
   a variable-speed motor positioned within the enclosure,
   a mounting assembly positioned within the enclosure and supporting the variable-speed motor,
   a flexible connector positioned within the enclosure and connected between a rotatable shaft of the variable-speed motor and a cups assembly hub of the anemometer,
   a signal receiving meter positioned outside of the enclosure and electrically connected to a signal producing output of the anemometer, and
   a vacuum pump configured to establish a vacuum within the enclosure so that drag effects on the cups assembly hub of the anemometer are eliminated when driven by the variable-speed motor.

2. The apparatus of claim 1 further comprising a variable-speed motor controller positioned outside of the enclosure and electrically connected to the variable-speed motor, the controller configured to selectively control rotational speed of the variable-speed motor.

3. The apparatus of claim 1 wherein the anemometer is configured to produce an output frequency signal proportional to rotational rate of the cups assembly hub.

4. The apparatus of claim 3 wherein signal receiving meter is a frequency meter.

5. The apparatus of claim 1 further comprising a processor configured to control operation of the variable speed motor controller and to capture output signals produced by the anemometer.

6. The apparatus of claim 2 wherein the anemometer is configured to produce an output frequency signal proportional to rotational rate of the cups assembly hub.

7. The apparatus of claim 2 further comprising a processor configured to control operation of the variable speed motor controller and to capture output signals produced by the anemometer.

8. A method for calibrating a cup anemometer having a non-removable cupset, the method comprising:
   mechanically connecting a cups assembly hub of the anemometer to a rotatable shaft of a variable-speed motor,
   placing at least the anemometer under vacuum so that drag effects on the cups assembly hub of the anemometer are eliminated when driven by the variable-speed motor,
   controlling the variable-speed motor to drive the cups assembly hub of the anemometer at a number of different rotational speeds,
   recording electrical signals produced by the anemometer at each of the number of different rotational speeds, and
   generating calibration data for the anemometer based on the recorded electrical signals and on expected wind speed values at each of the number of different rotational speeds.

9. The method of claim 8 further comprising mechanically connecting the cups assembly hub of the anemometer to the rotatable shaft of a variable-speed motor via a flexible connector.

10. The method of claim 9 further comprising placing a combination of the variable speed motor and the anemometer under vacuum.

11. The method of claim 10 wherein placing a combination of the variable speed motor and the anemometer under vacuum comprises placing the combination of the variable speed motor and the anemometer in an air-tight enclosure, fluidly coupling a vacuum pump to the air-tight enclosure and controlling the vacuum pump to establish the vacuum within the airtight enclosure.

12. The method of claim 8 wherein controlling the variable-speed motor to drive the cups assembly hub of the anemometer at a number of different rotational speeds comprises controlling the variable-speed motor to drive the cups assembly hub at each of the number of different rotational speeds for a predefined time period before driving the cups assembly hub at a next one of the number of different rotational speeds.

13. The method of claim 8 wherein recording electrical signals produced by the anemometer at each of the number of different rotational speeds comprises recording the electrical signals produced by the anemometer for a predetermined time period at each of the number of different rotational speeds.

14. The method of claim 8 wherein the electrical signals produced by the anemometer are frequency signals corresponding to rates of rotation of the cups assembly hub of the anemometer.

15. The method of claim 8 wherein generating calibration data for the anemometer comprises:
   determining a transfer function of the anemometer,
   computing the expected wind speed values for each of the number of different rotational speeds according to the transfer function of the anemometer,
   computing observed wind speed values from the recorded electrical signals produced by the anemometer for each of the number of different rotational speeds according to the transfer function of the anemometer, and
   performing a regression analysis on the expected and observed wind speed values.

16. The method of claim 15 wherein generating calibration data for the anemometer further comprises computing calibration-corrected observed wind speed values based on the observed wind speed values and on data produced by the regression analysis.

17. The method of claim 16 wherein generating calibration data for the anemometer further comprises determining that the calibration-corrected observed wind speed values are acceptable if the calibration-corrected observed wind speed values deviate from corresponding ones of the expected wind speed values by less than a predefined deviation value.

18. The method of claim 8 further comprising placing a combination of the variable speed motor and the anemometer under vacuum.

19. The method of claim 18 wherein placing a combination of the variable speed motor and the anemometer under vacuum comprises placing the combination of the variable speed motor and the anemometer in an air-tight enclosure, fluidly coupling a vacuum pump to the air-tight enclosure and controlling the vacuum pump to establish the vacuum within the airtight enclosure.

20. The method of claim 9 wherein generating calibration data for the anemometer comprises:
   determining a transfer function of the anemometer,
   computing the expected wind speed values for each of the number of different rotational speeds according to the transfer function of the anemometer,
   computing observed wind speed values from the recorded electrical signals produced by the anemometer for each of the number of different rotational speeds according to the transfer function of the anemometer, and
   performing a regression analysis on the expected and observed wind speed values.

* * * * *